(12) United States Patent
Goulert

(10) Patent No.: US 9,595,062 B2
(45) Date of Patent: Mar. 14, 2017

(54) METHODS AND SYSTEMS FOR RENDERING AN OPTIMIZED ROUTE IN ACCORDANCE WITH GPS DATA AND A SHOPPING LIST

(71) Applicant: WAL-MART STORES INC., Bentonville, AR (US)

(72) Inventor: Valerie Goulert, Seattle, WA (US)

(73) Assignee: WAL-MART STORES, INC., Bentonville, AR (US)

( * ) Notice: Subject to any disclaimer, the term of this patent is extended or adjusted under 35 U.S.C. 154(b) by 0 days.

(21) Appl. No.: 13/650,652

(22) Filed: Oct. 12, 2012

(65) Prior Publication Data
US 2014/0108193 A1 Apr. 17, 2014

(51) Int. Cl.
G06Q 30/00 (2012.01)
G06Q 30/06 (2012.01)
G06Q 30/02 (2012.01)
G06Q 20/32 (2012.01)
H04W 4/02 (2009.01)
G06Q 10/04 (2012.01)

(52) U.S. Cl.
CPC ....... *G06Q 30/0639* (2013.01); *G06Q 10/047* (2013.01); *G06Q 20/322* (2013.01); *G06Q 30/0259* (2013.01); *G06Q 30/0633* (2013.01); *H04W 4/02* (2013.01); *H04W 4/021* (2013.01)

(58) Field of Classification Search
CPC .... G06Q 30/06–30/0643; G06Q 30/08; G06Q 30/0259; G06Q 20/322; H04W 4/02; H04W 4/021; H04W 4/025; H04L 67/18
USPC ............................. 705/14.1–14.7, 26.1–27.23
See application file for complete search history.

(56) References Cited

U.S. PATENT DOCUMENTS

| 5,557,513 | A | * | 9/1996 | Frey ................... G06Q 10/0631 705/16 |
| 5,887,271 | A | | 3/1999 | Powell |
| 5,890,135 | A | | 3/1999 | Powell |
| 5,963,948 | A | | 10/1999 | Shilcrat |

(Continued)

FOREIGN PATENT DOCUMENTS

WO WO2011038847 A1 4/2011

OTHER PUBLICATIONS

Free aisle411 In-Store Navigation and Shopping Platform API and SDK Now Available for Retailers and App Developers Oct. 11, 2011, 08:00 ET from aisle411 (http://www.prnewswire.com/news/aisle411).*

*Primary Examiner* — William Allen
(74) *Attorney, Agent, or Firm* — Howard & Howard Attorneys PLLC

(57) ABSTRACT

Techniques for optimizing a shopping agenda are disclosed. The techniques include receiving an electronic shopping list containing one or more items, each item indicating a product sold by a retailer. The techniques further include obtaining a store map, the store map being indicative of a layout of a store associated with the retailer. The techniques further include determining one or more product waypoints based on the one or more items in the electronic shopping list and the store map, each product waypoint of the one or more product waypoints corresponding to one of the one or more items and being indicative of a location of the product indicated by the item in the store. The techniques also include determining a route traveling through each of the one or more product waypoints and providing the route for display.

20 Claims, 10 Drawing Sheets

(56) References Cited

U.S. PATENT DOCUMENTS

| | | |
|---|---|---|
| 6,000,610 A | 12/1999 | Talbott |
| 6,123,259 A | 9/2000 | Ogasawara |
| 6,533,173 B2 | 3/2003 | Benyak |
| 7,263,500 B2 | 8/2007 | Deal |
| 7,734,507 B2 | 6/2010 | Ritter |
| 7,819,315 B1 | 10/2010 | Pienkos |
| 8,639,440 B2 | 1/2014 | Nicholson |
| 2002/0065714 A1 | 5/2002 | Goodwin |
| 2002/0167408 A1* | 11/2002 | Trajkovic .............. G06Q 30/06 701/532 |
| 2002/0178013 A1 | 11/2002 | Hoffman |
| 2004/0217166 A1 | 11/2004 | Myers |
| 2005/0256782 A1 | 11/2005 | Sands |
| 2009/0012704 A1 | 1/2009 | Franco |
| 2009/0182499 A1 | 7/2009 | Bravo |
| 2010/0057345 A1* | 3/2010 | Baldi .................... G01C 21/20 701/533 |
| 2010/0076829 A1* | 3/2010 | Bishop ....................... 705/14.15 |
| 2011/0178863 A1* | 7/2011 | Daigle ............... G06Q 30/0231 705/14.31 |
| 2011/0224896 A1* | 9/2011 | Napieraj ........... G01C 21/3614 701/532 |
| 2013/0103539 A1* | 4/2013 | Abraham .............. G06Q 10/04 705/26.8 |
| 2013/0117695 A1* | 5/2013 | Hammoud ................... 715/761 |

* cited by examiner

METHODS AND SYSTEMS FOR RENDERING AN OPTIMIZED ROUTE IN ACCORDANCE WITH GPS DATA AND A SHOPPING LIST

RELATED U.S. APPLICATION

This application is related to U.S. application Ser. No. 13/650,559, filed Oct. 12, 2012 and U.S. application Ser. No. 13/650,723, filed Oct. 12, 2012. The application is incorporated herein by reference for all purposes.

BACKGROUND INFORMATION

Field of the Disclosure

The present invention relates generally to systems and methods for optimizing shopping techniques. In particular, assisting a user with an electronic shopping list on a mobile computing device optimize their shopping experience by determining a route for shopping in a store based on the items contained in the electronic shopping list.

Background

Many consumers visit supermarkets and superstores when shopping for products such as groceries, office supplies, and household wares. Typically, these stores can have dozens of aisles and/or sections. Accordingly, traversing these aisles looking for specific products may be a harrowing experience. Situations may arise where a consumer takes a brute force approach to shopping for products, where the consumer crosses the store multiple times to find all the intended products. Consumers may use a digital shopping list in order to better organize and remember their items when preparing to go shopping. The shopping list alone, however, may not be the complete solution to the problem of repeatedly crossing aisles during shopping or visiting the same regions of the stores multiple times.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
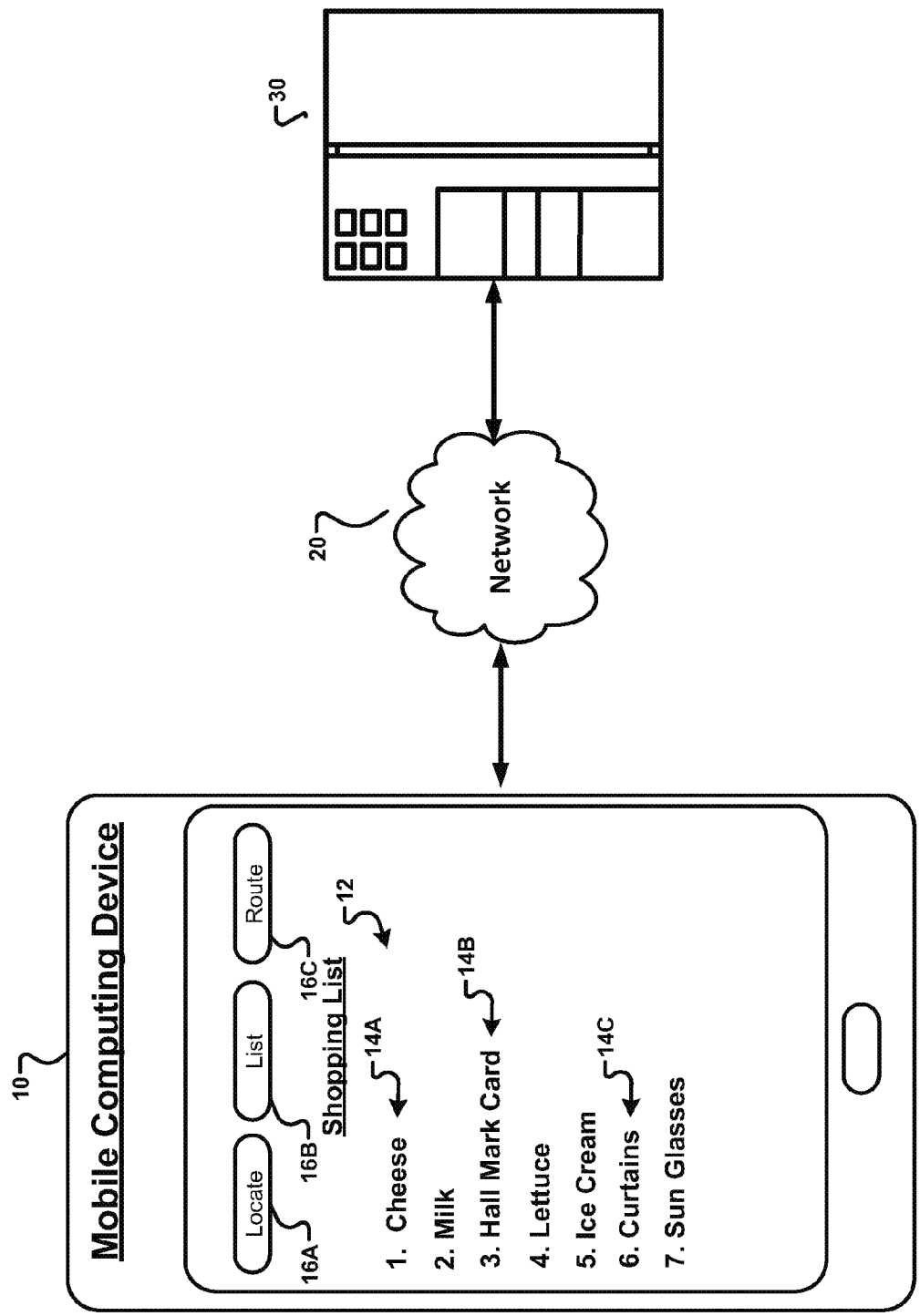
FIG. 1 is a schematic illustrating a mobile computing device in communication with a shopping list server according to some embodiments of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Many consumers utilize their mobile computing devices to prepare electronic shopping lists when preparing to shop for products. As used herein, the term "product" can refer to groceries, foods, office supplies, clothing wares, or any other fungible goods sold by a retailer. As used herein, the term "electronic shopping list" can refer to any electronic representation of a shopping list that contains one or more items. As used herein, the term "item" can refer to any type of indicator of a product sold by a retailer. An item can refer to a generic product or a specific product. A generic product is a genus of product, e.g., eggs, milk, and bread. A specific product is a brand of product, e.g., PEPSI®, TUMS®, POP TARTS®. Furthermore, a specific product can also include a unitary amount, e.g., a 12 pk of PEPSI®. As used herein, the term "mobile computing device" can refer to any type of mobile computing devices, such as mobile telephones, laptop computers, and tablet computers, or stationary computing devices.

Techniques are disclosed herein for optimizing a mobile computing device user's shopping experience based on the electronic shopping list. In particular, the techniques include determining a product waypoint for each product indicated in the electronic shopping list and displaying the product waypoints to the user using, for example, the mobile computing device. As used herein the term "waypoint" can refer generally to a location in a store, e.g., a location of a product or an entrance. A waypoint can be represented in GPS coordinates, Cartesian coordinates, e.g., an (x, y) point if the store is divided into a Cartesian plane, and/or can be represented using reference points, e.g., "aisle 4, 50 feet from the front of the store."

Furthermore, techniques are disclosed for determining a route for the user to take when shopping for the items in the electronic shopping list. The techniques include determining product waypoints corresponding to each product indicated in the electronic shopping list and determining an optimized route based on the waypoints. The route can be optimized to minimize or substantially minimize the amount of distance traveled or the amount of time to travel through the store. It should be appreciated that the route can be optimized for other criteria as well.

Additionally, techniques for grouping the items in electronic shopping list are also disclosed. The items can be grouped based on the type of products and/or a section of the store where the products are located.

Referring now to FIG. 1, a mobile computing device 10 in communication with a shopping list server 30 via a network 20 is depicted. In some embodiments, the mobile computing device 10 is configured to allow a user to generate an electronic shopping list. As shown in the illustrative example, the mobile computing device 10 is displaying a graphical user interface (GUI) 12 that is displaying an electronic shopping list comprised of a plurality of items, e.g., item 14A, item 14B, and item 14C. The GUI 12 allows the user to add items to the electronic shopping list. It should be appreciated that the mobile computing device 10 may obtain the electronic shopping list in any other suitable manner. For instance, a photograph of a handwritten shopping list can be captured using a digital camera and converted to an electronic shopping list. In another example, the electronic shopping list can be uploaded from another source or can be learned from the user's purchasing habits.

The GUI 12 further includes a plurality of input objects which allow the user to provide commands to the mobile computing device 10. The input objects include a "locate" input object 16A, a "list" input object 16B, and a "route" input object 16C.

The locate input object 16A, when selected by a user, initiates an instruction to the mobile computing device 10 to obtain product waypoints corresponding to each of the items in the electronic shopping list. In response to receiving user input via the locate input object 16A, the mobile computing device 10 may determine a store at which the user intends to purchase the items and can send an indicator of the store and the electronic shopping list to the shopping list server 30. In some embodiments, the shopping list server 30 returns a product waypoint corresponding to each item in the electronic shopping list, each product waypoint indicating a location of a product in the determined store. The mobile computing device 30 can display the product waypoints to the user via the GUI 12. In some embodiments, the product waypoints can be displayed in the electronic shopping list and/or in a map of the store at which the user intends to purchase the items.

The list input object 16B, when pressed by the user, initiates an instruction to the mobile computing device 10 to obtain a rearranged electronic shopping list. The electronic shopping list may be rearranged based on the types of products indicated in the electronic shopping list, the sections of the products indicated in the electronic shopping list, or the locations of the products indicated in the electronic shopping list. In response to receive user input via the list input object 16B the mobile computing device may determine a store at which the user intends to purchase the products indicated in the electronic shopping list and can send an indicator of the store and the electronic shopping list to the shopping list server 30. In some embodiments, the shopping list server 30 returns an ordered electronic shopping list that is ordered according to the types, sections, and/or locations of the products. The mobile computing device 10 displays the ordered electronic shopping list in the GUI 12 that will be discussed in further detail below. Furthermore, in some embodiments, the shopping list server 30 returns product waypoints corresponding to the items in the ordered electronic shopping list, such that the mobile computing device 10 displays the product waypoints in relation to their respective items.

The route input object 16C, when pressed by the user, initiates an instruction to the mobile computing device 10 to obtain an optimized route for the user to travel when shopping for the items in the electronic shopping list. In response to receiving input via the route input object 16C, the mobile computing device 10 can determine a store at which the user intends to purchase the items and can send an indicator of the store and the electronic shopping list to the shopping list server 30. The shopping list server 30 can return a map of the store, waypoints corresponding to the items in the electronic shopping list, and a route to recommend to the user. The mobile computing device 10 can display the map to the user, such that the waypoints and/or the route are displayed in the map.

Figure 2:
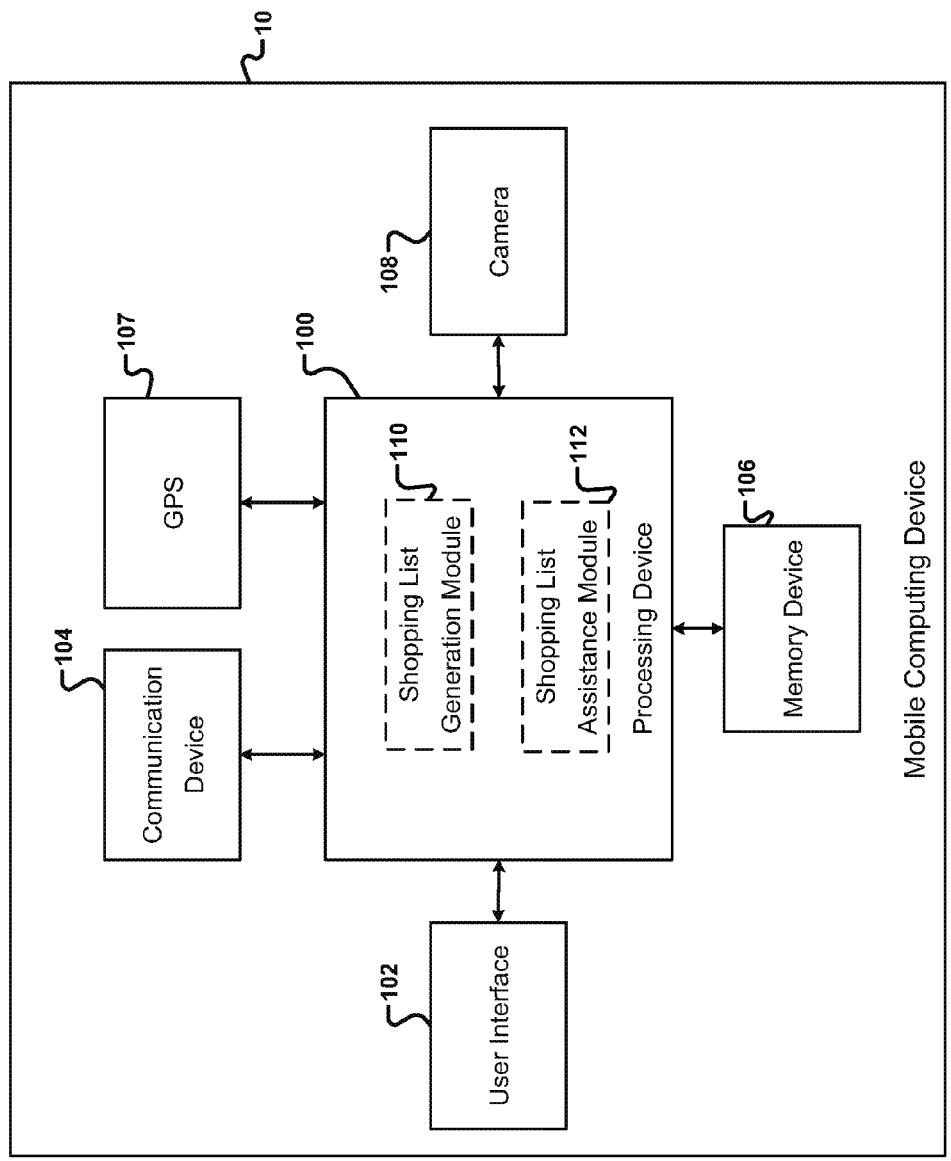
FIG. 2 is a schematic illustrating example components of the mobile computing device of FIG. 1.

Referring now to FIG. 2, a schematic illustrating example components of the mobile computing device of FIG. 1 is illustrated. In the illustrative embodiment, the mobile computing device includes a processing device 100, a user interface 102, a communication device 104, a memory device 106, a global positioning system (GPS) 107, and a camera 108. It is noted that the mobile computing device 10 can include other components and some of the components are not required.

The processing device 100 can include memory, e.g., read only memory (ROM) and random access memory (RAM), storing processor-executable instructions and one or more processors that execute the processor-executable instructions. In embodiments where the processing device 100 includes two or more processors, the processors can operate in a parallel or distributed manner. The processing device 100 can execute the operating system of the mobile computing device 10. In the illustrative embodiment, the processing device 100 also executes a shopping list generation module 110 and a shopping assistance module 112, which are described in greater detail below.

The user interface 102 is a device that allows a user to interact with the mobile computing device 10. While one user interface 102 is shown, the term "user interface" can include, but is not limited to, a touch screen, a physical keyboard, a mouse, a microphone, and/or a speaker. The communication device 104 is a device that allows the mobile computing device 10 to communicate with another device, e.g., the shopping list server 30, via the network 20. The communication device 104 can include one or more wireless transceivers for performing wireless communication and/or one or more communication ports for performing wired communication. The memory device 106 is a device that stores data generated or received by the mobile computing device 10. The memory device 106 can include, but is not limited to, a hard disc drive, an optical disc drive, and/or a flash memory drive.

The GPS 107 determines a location of the mobile computing device 10 by communicating with a plurality of GPS satellites. The GPS 107 can perform known triangulation techniques to determine the GPS coordinates of the mobile computing device 10. It should be appreciated that while a GPS 107 is shown, any other suitable component for determining the location of the mobile computing device 10 can be implemented.

The camera 108 is a digital camera that captures a digital photograph. The camera 108 receives an instruction to capture an image, captures an image of an object, i.e., a handwritten shopping list, and outputs the digital photograph. The digital photograph can be a bitmap file. The bitmap file can be a bitmap, a JPEG, a GIF, or any other suitably formatted file. The camera 108 can receive the instruction to capture the image from the processing device 100 and can output the digital photograph to the processing device 100.

The shopping list generation module 110 allows a user to generate an electronic shopping list and displays the electronic shopping list to the user in the GUI 12 (FIG. 1) via the user interface 102. As discussed previously the shopping list generation module 110 may be configured to generate the electronic shopping list based on items manually entered by the user, a photograph of a handwritten shopping list, previous electronic shopping lists of the user and/or a purchase history of the user. It is appreciated that the shopping list generation module 110 can generate the electronic shopping list in any other suitable manner.

The shopping assistance module 112 assists the user when preparing to shop for the items in the electronic shopping list. The shopping assistance module 112 can be configured to determine a store location indicating the store at which the user intends to purchase the products indicated in the electronic shopping list. The store location can be represented in GPS coordinates of the store or by a store identifier, e.g., an alphanumeric string that identifies the store from other stores. In some embodiments, the shopping assistance module 112 uses the current location of the mobile computing device 10 to determine the store location. For instance, if a retailer operates three different stores in the vicinity of the mobile computing device 10, the shopping assistance module 112 can select the nearest store as the store location. The store locations can be obtained from a remote server, e.g., the shopping list server 30, and/or can be stored on the memory device 106 of the mobile computing device 10. In some embodiments, the shopping assistance module 112 allows the user to select the store location from a plurality of different store locations. For example, the shopping assistance module 112 can display a drop down menu in the GUI 12 that allows the user to select the store location. In these embodiments, the shopping assistance module 112 may instruct the user to provide a postal zip code and/or a city and state of the user. Using this information, the shopping assistance module 112 can display the N nearest store locations, where N is an integer greater than or equal to one. Alternatively, the shopping assistance module 112 can learn the user's preferred store location or can store the user's preferred store location. It should be appreciated that the shopping assistance module 112 may determine the store location in any other suitable manner.

In some embodiments, the shopping assistance module 112 determines the product waypoints for the items in the electronic shopping list. In some of these embodiments, the shopping assistance module 112 provides the electronic shopping list, or the items contained therein, and the store location to the shopping list server 30. The shopping list server 30 can return the product waypoints corresponding to the items contained in the electronic shopping list to the shopping assistance module 112. The shopping assistance module 112 can display the product waypoints to the user. In this way, the user may view the product waypoints when shopping to more efficiently locate the products indicated in the electronic shopping list when shopping.

Figure 3:
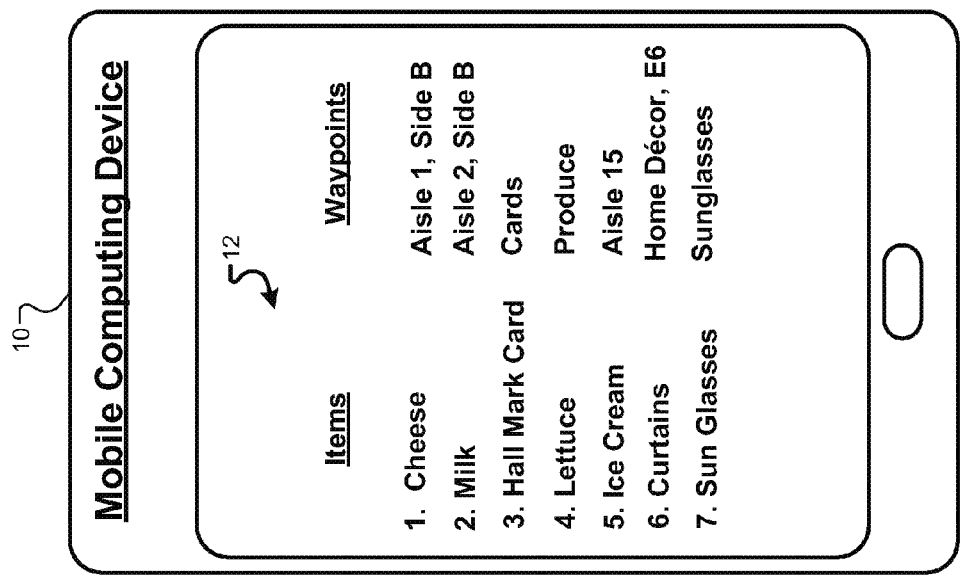
FIG. 3 is a schematic illustrating an electronic shopping list having product waypoints displayed therein being displayed by the mobile computing device of FIG. 1.

In some embodiments, each product waypoint may be displayed in the electronic shopping list relative to its corresponding item. For example, FIG. 3 illustrates an example of an electronic shopping list that has product waypoints displayed in relation to their corresponding items. In the illustrated example, the electronic shopping list is displayed on the left-hand side of the GUI 12. On the right-hand side, the product waypoints corresponding to each item are illustrated. As can be appreciated, the product waypoints can identify a specific aisle if the product indicated by the item is in an aisle. Otherwise, a description of the section of the product, e.g., "Produce" or "Sunglasses," can be used to show the location of the product. It is noted that the example of FIG. 3 is provided for example only and not intended to be limiting.

Figure 4:
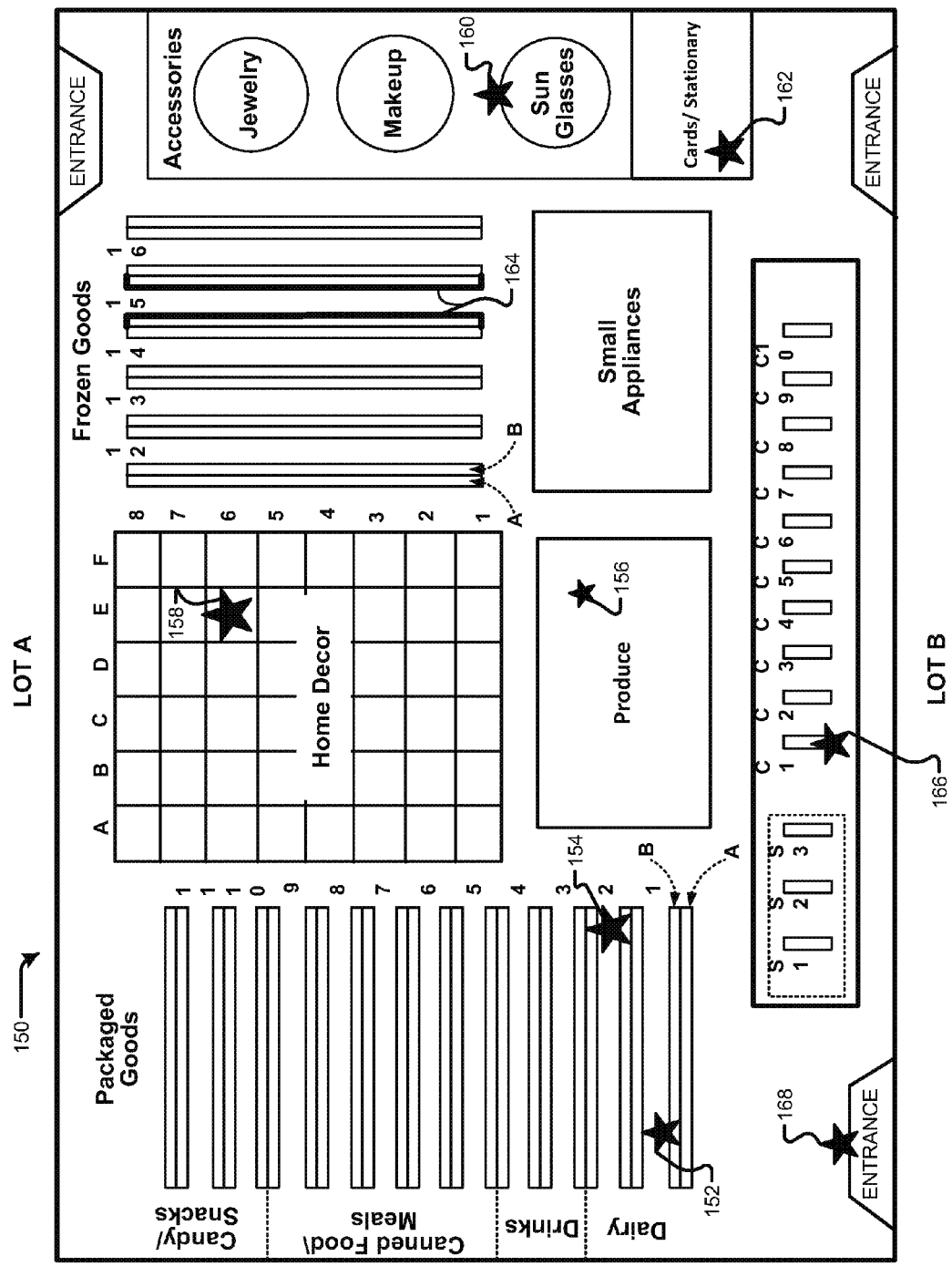
FIG. 4 is a drawing of a map having a plurality of waypoints displayed therein according to some embodiments of the present disclosure.

In some embodiments, the shopping list server 30 may also return a map corresponding to the store location. As used herein, the term "map" may refer to a digital representation of the layout of the corresponding store location. Referring to FIG. 4, an example of a map 150 having a plurality of product waypoints displayed therein is illustrated. The shopping assistance module 112 can display the map 150 to the user via the user interface 102 (FIG. 2). In the illustrated example, the product waypoints are displayed as graphical icons, e.g., stars. For example, the map 150 includes a first product waypoint 152 (e.g., location of "milk") and a second product waypoint 154 (e.g., location of "cheese") in the dairy section. Additionally, the map 150 includes a third product waypoint 156 (e.g., location of "lettuce") in the produce section, a fourth product waypoint 158 (e.g., location of "curtains") in the home décor department, a fifth product waypoint 160 (e.g., location of "sunglasses") in the kids clothing department, and a sixth product waypoint 162 (e.g., location of "HALLMARK® card") in the cards/stationary department. Furthermore, the map 150 includes a seventh waypoint 164 (e.g., location of "ice cream") in the frozen goods section. As can be appreciated, the graphical icon used to represent the seventh waypoint 164 is a pair of bold lines, thereby indicating that the both sides of aisle 14 contain ice cream.

In some embodiments, the graphical icons representing the product waypoints can be displayed in the map 150 in varying sizes to indicate to the user the relative amount of space that is occupied by the product indicated in the electronic shopping list. For example, the product referenced by the first product waypoint 152 may represent the location of "cheese" while the product referenced by the second product waypoint 154 represent the location of "milk." As can be appreciated by the respective sizes of the first product waypoint 152 and the second product waypoint 154 in this example, the amount of space occupied by milk is greater than the amount of space occupied by cheese.

Furthermore, in some embodiments, the map may also display an entrance waypoint 168 and/or a checkout waypoint 166. The entrance waypoint 168 may indicate a suggested entrance for the user to enter/exit from. The checkout waypoint 166 may indicate one or more suggested checkout lanes at which the user can checkout. As will be discussed in greater detail below, the entrance waypoint 168 and the checkout waypoint 166 can be determined based on the items in the electronic shopping list.

It is noted that in some embodiments, the shopping assistance module 112 can be configured to receive the map 150 and the various waypoints 152-168, and to render the map 150 with the waypoints 152-168 displayed therein. In other embodiments, the shopping list server 30 may be configured to render the various waypoints 152-168 in the map 150 and to provide the rendered map 150 to the shopping assistance module 112.

In some embodiments, the shopping assistance module 112 can utilize the current location of the user to display the current location of the user in the map 150 while the user is shopping. In this way, the user can reference his or her location in relation to the various waypoints 152-168 to better navigate through the store. It is noted that the example map 150 of FIG. 4 is provided for example and not intended to be limiting.

Referring back to FIG. 2, in some embodiments the shopping assistance module 112 is configured to determine an optimized route for the shopper to travel when shopping for the products indicated in the electronic shopping list. In some of these embodiments, the shopping assistance module 112 provides the electronic shopping list, or the items contained therein, and the store location to the shopping list server 30. The shopping list server 30 can return a route corresponding to the items contained in the electronic shopping list to the shopping assistance module 112. In some embodiments, the route can be optimized, for example, to minimize a distance traveled through the store or to minimize an amount of time spent traveling through the store. The shopping list server 30 may further return the product waypoints corresponding to the items contained in the electronic shopping list.

Figure 5:
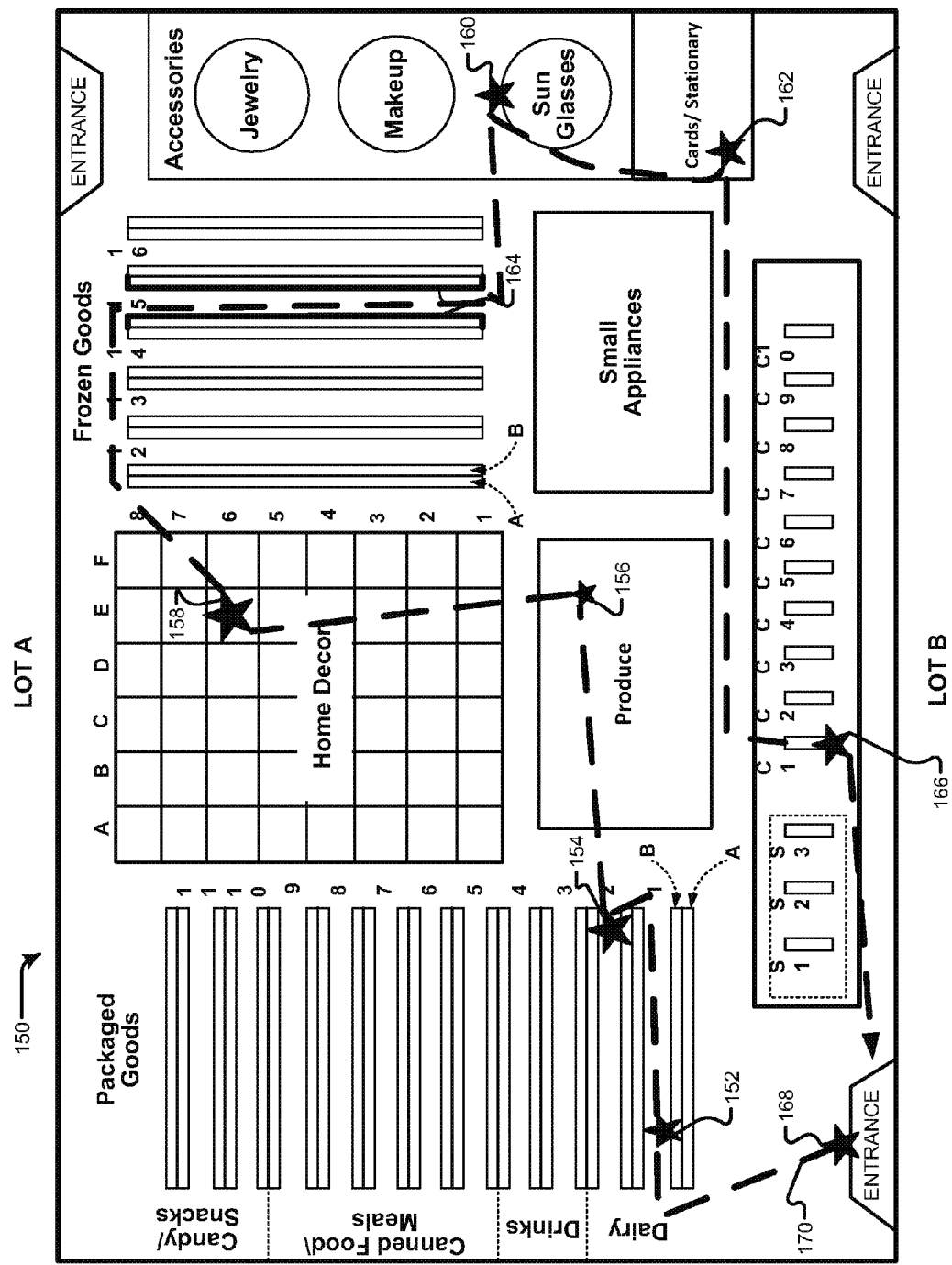
FIG. 5 is a drawing of a map having an optimized route displayed therein according to some embodiments of the present disclosure.

In some embodiments, the shopping assistance module 112 can display the route to the user in a map. FIG. 5 illustrates an example of a map 150 having a route 170 displayed therein. The example map 150 of FIG. 5 builds upon the example map 150 of FIG. 4. Accordingly, objects appearing in FIG. 5, which were discussed in FIG. 4 are referenced using the same reference numerals. In the illustrated example, the route 170 begins at the entrance waypoint 168 and travels through the first waypoint 152, the second waypoint 154, the third waypoint 156, the fourth waypoint 158, the seventh waypoint 165, the fifth waypoint 160, the sixth waypoint 162, and the cashier waypoint 166.

It is noted that in some embodiments, the shopping assistance module 112 can be configured to receive the map 150, the various waypoints 152-168, and the route 170 and to render the route 170 and the waypoints 152-168. In other embodiments, the shopping list server 30 may be configured to render the route 170 and the various waypoints 152-168 in the map 150 and to provide the rendered map 150 to the shopping assistance module 112. In some embodiments, the shopping assistance module 112 can utilize the current location of the user to display the current location of the user in the map 150 while the user is shopping. In this way, the user can reference his or her location in relation to the route 170 to better navigate through the store. It is noted that the example map 150 of FIG. 5 is provided for example and not intended to be limiting.

Referring back to FIG. 2, in some embodiments the shopping assistance module 112 is configured to rearrange and/or group the items in the electronic shopping list, such that the items are rearranged or grouped in a manner to increase the efficiency of the user's shopping experience. For example, in some embodiments the items can be rearranged according to the respective locations of the products indicated by the items. In these embodiments, the items can be rearranged such that the items are displayed in an order that corresponds to the respective distance between other items. For example, in the electronic shopping list of FIG. 1, "curtains" are listed after "HALLMARK® card". Assuming that curtains are in the home décor department and HALLMARK® cards are located in the stationary department, the items may be rearranged in the electronic shopping list such that the "HALLMARK® card" is displayed directly before or after sunglasses, while "curtains" is displayed after lettuce and before ice cream.

Figure 6:
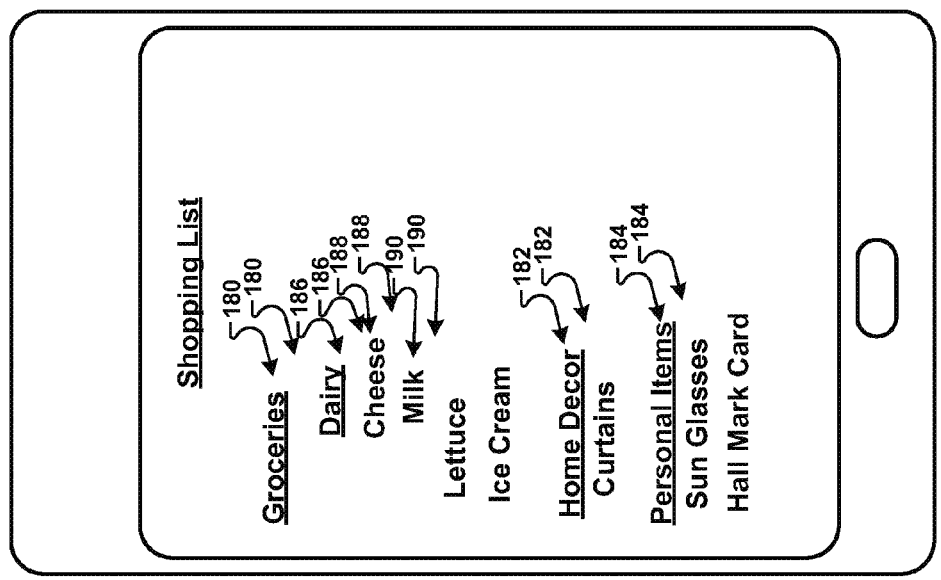
FIG. 6 is a drawing illustrating an ordered electronic shopping list ordered according to groupings and sections, the ordered electronic shopping list being displayed by the mobile computing device of FIG. 1.

In other embodiments, the items can be grouped according to the types of the products indicated in the electronic shopping list and/or the respective sections/departments of the products indicated in the electronic shopping list. Referring to FIG. 6, an example of an ordered electronic shopping list is illustrated. In the example, the electronic shopping list of FIG. 1 has been rearranged and grouped according to product type. For example, the ordered electronic shopping list includes a "groceries" grouping 180, a home décor grouping 182, and a personal items grouping 184. Furthermore, within the groupings, the ordered electronic shopping list may be grouped according to section/department. For example, the "cheese" item 188 and the "milk" item 190 have been grouped in a "dairy" grouping 186. As can be appreciated, the "dairy" grouping 186 is indicative of the section of the store where cheese and milk can be found. The example of FIG. 6 is provided for illustrative purposes and not intended to be limiting. The items appearing in the ordered shopping list can be grouped according to any other suitable categories.

Figure 7:
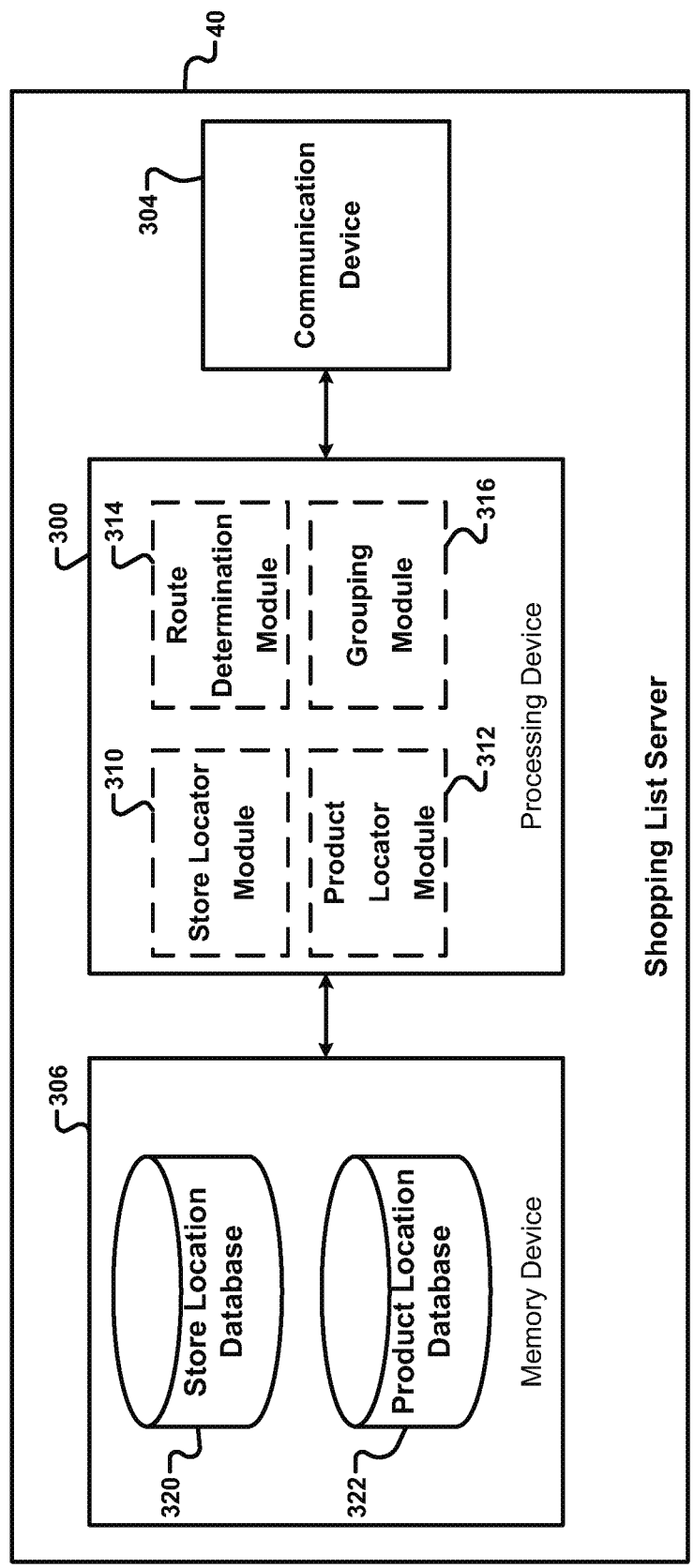
FIG. 7 is a drawing illustrating example components of the shopping list server of FIG. 1.

As referenced above, the shopping list server 30 may be configured to perform one or more functions at the request of the mobile computing device 10. FIG. 7 illustrates an example embodiment of the shopping list server 30 configured to perform one or more of the requested functions. In the illustrated embodiment, the shopping list server 30 may include a processing device 300, a communication device 304, and memory device 306.

The processing device 300 can include memory, e.g., read only memory (ROM) and random access memory (RAM), storing processor-executable instructions and one or more processors that execute the processor-executable instructions. In embodiments where the processing device 300 includes two or more processors, the processors can operate in a parallel or distributed manner. In the illustrative embodiment, the processing device 300 executes one or more of a store locator module 310, a product locator module 312, a route determination module 314, and a grouping module 316.

The communication device 304 is a device that allows the shopping list server 30 to communicate with another device, e.g., the mobile computing device 10, via the network 20. The communication device 304 can include one or more wireless transceivers for performing wireless communication and/or one or more communication ports for performing wired communication.

The memory device 306 is a device that stores data generated or received by the shopping list server 30. The memory device 306 can include, but is not limited to a hard disc drive, an optical disc drive, and/or a flash memory drive. Further, the memory device 306 may be distributed and located at multiple locations. The memory device 306 is accessible to the processing device 300. In some embodiments, the memory device 306 stores a store location database 320 and a product location database 322.

In some embodiments, the store location database 320 can store the store locations of one or more stores operated or associated with a retailer. The store location database 320 may be queried using a specific location, e.g., GPS coordinates, or a general location, e.g., postal zip code or city/state, and can return one or more stores that are proximate to the specific or general location. The store location database 320 may further be configured to store maps corresponding to each store location. The store location database 320 may be queried with a store location and can return the store map corresponding to the store location.

In some embodiments, the product location database 322 stores product waypoints indicating locations of the products sold by a retailer in the one or more stores operated or associated with the retailer. For example, the product location database 322 may store the location of "milk" in each of the stores operated or associated with the retailer. The product location database 322 may be queried with the item "milk" and a specific store location, and may return a waypoint indicating the location of "milk" at the specific store location.

The product location database 322 may be configured to store waypoints for specific products and generic products. For example, the product location database 322 may be configured to store waypoints indicating the location of "ice cream," a generic product, and the location of "BEN AND JERRY'S® ice cream," a specific product. It should be noted that a waypoint corresponding to a generic product or specific product may be represented using a starting location and ending location. For example, a waypoint corresponding to "ice cream" may indicate where the ice cream section begins and where the "ice cream" section ends. Similarly, a waypoint corresponding to "BEN AND JERRY'S® ice cream" may indicate where the BEN AND JERRY'S® ice cream begins and ends. It should be appreciated that when a specific product is a species of a generic product, e.g., BEN AND JERRY'S® ice cream is a species of "ice cream," the waypoint corresponding to a specific product may be wholly contained within the waypoint corresponding to the generic product. In some embodiments, a generic product may be located in more than one location in the store. For example, milk may be located in the dairy section, while organic milk may be located in the natural foods location. In this type of scenario, the product location database 322 may store more than one location for milk. When such a situation arises, the product locator module 312 may retrieve multiple product waypoints, such that the multiple waypoints corresponding to the generic product are provided to the mobile computing device 10.

The product location database 322 may further store a type of each product sold by the retailer, e.g., groceries, home décor, and personal goods, and/or a section of the product, e.g., dairy or men's clothing. Furthermore, the types and/or sections can be stored relative to each store location. In this way, the product location database 322 can be queried with a store location and a product and can return a type of the product and/or a section of the product at the store location.

As discussed, the processing device 300 may execute the store locator module 310. The store locator module 310 receives a location from the mobile computing device 10 and determines one or more store locations corresponding to the received location. In some embodiments, the store locator module 310 queries the store location database 320 with the received location and receives one or more store locations that correspond to the received location. For example, the store location database 320 may return any store locations that are within a predetermined distance, e.g., 10 miles, from the received location. When more than one store location is received, the store locator module 310 may automatically select the store location nearest to the received location or may provide the store locations to the mobile computing device 10, thereby allowing the mobile computing device 10 or the user to select the store location.

The product locator module 312 receives an electronic shopping list containing one or more items and determines product waypoints corresponding to the one or more items. In some embodiments, the product locator module 312, for each item in the electronic shopping list, queries the product location database 322 with the item and a store location (which may have been determined by the store locator module 310) and receives a product waypoint indicating a location of the product indicated by the item in the store corresponding to the store location. Furthermore, the product locator module 312 can be configured to determine an entrance waypoint and/or a checkout waypoint based on the items contained in the electronic shopping list.

Once the product locator module 312 has determined the various waypoints, e.g., product waypoints, checkout waypoint, and entrance waypoint, the product locator module 312 may provide the product waypoints to the mobile computing device 10, such that the mobile computing device 10 can display the product waypoints in the electronic shopping list.

In some embodiments, the product locator module 312 may be further configured to obtain a map corresponding to the store location. The product locator module 312 can obtain the map from the store location database 320. In some of these embodiments, the product locator module 312 can provide the map and the product waypoints to the mobile computing device 10. Alternatively, the product locator module 312 can render the map with the various waypoints displayed therein. In these embodiments, the product locator module 312 may use the locations indicated by the various waypoints to determine locations in the map where the graphical icons should be displayed. The product locator module 312 can then insert the graphical icons at the determined locations. The product locator module 312 can provide the rendered image to the mobile computing device 10.

Figure 8:
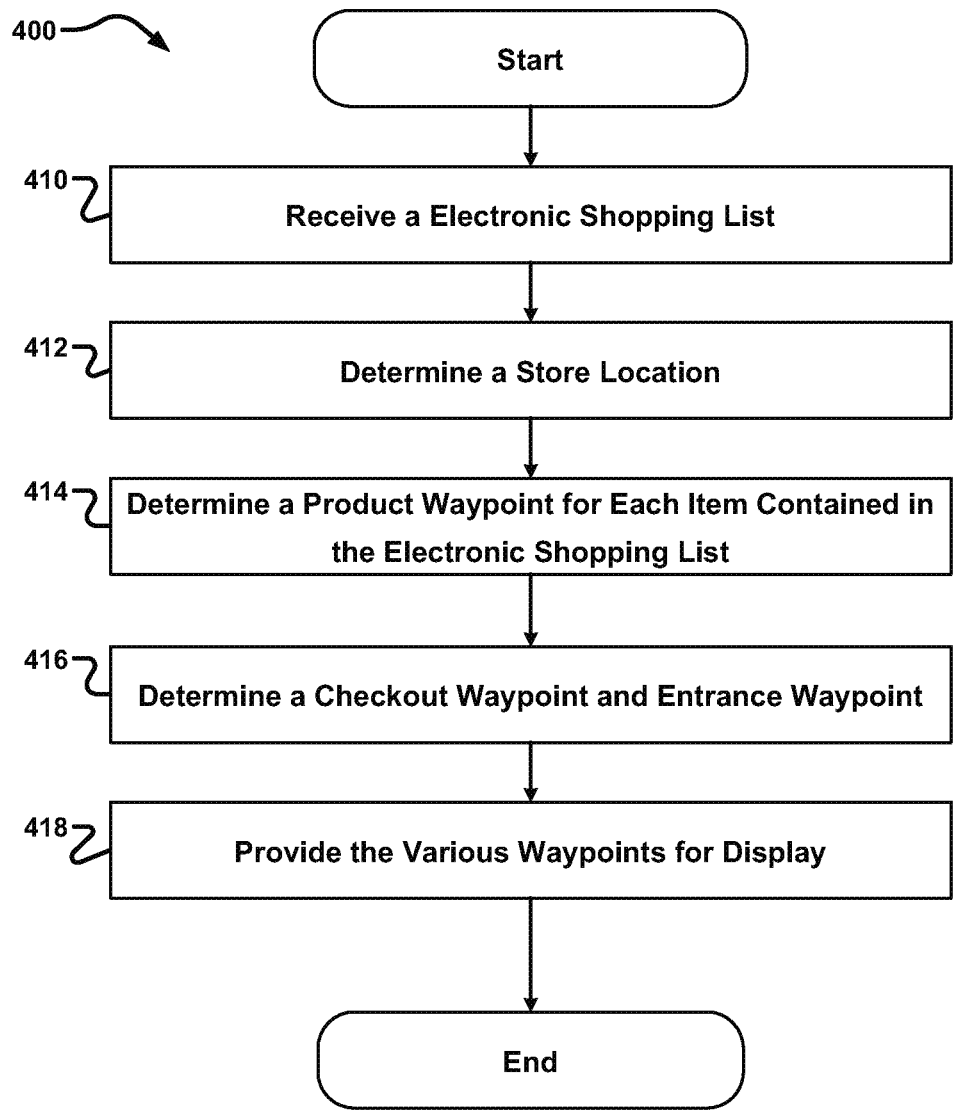
FIG. 8 is a flow chart illustrating an example method for determining a plurality of waypoints based on items contained in an electronic shopping list according to some embodiments of the present disclosure.

Referring now to FIG. 8, an example method 400 for determining a set of waypoints corresponding to an electronic shopping list is illustrated. In the illustrated example, the method 400 is executed by the processing device 300 of the shopping list server 30. It is noted that the method 400 may be modified such that the method 400 can be executed by the processing device 100 of the mobile computing device 10.

At operation 410, the product locator module 312 receives the electronic shopping list (or the items contained therein) from the mobile computing device 10. At operation 412, the product locator module 312 determines a store location. In some embodiments, the mobile computing device 10 may provide the store location. In other embodiments, the mobile computing device 10 may provide its current location, and the product locator module 312 may obtain the store location from the store locator module 310.

At operation 414, the product locator module 312 determines one or more product waypoints respectively corresponding to the one or more items contained in the electronic shopping list. For each item, the product locator module 312 can query the product locations database 322 with the item and the store location. As discussed, the product locations database 322 returns a product waypoint indicating the location of the product indicated by the item in the store corresponding to the store location.

At operation 416, the product locator module 312 determines a checkout waypoint and an entrance waypoint. In some embodiments, the product locator module 312 can determine the checkout waypoint based on the number of items in the electronic shopping list and/or the determined product waypoints. For example, in some embodiments the product locator module 312 sets the checkout waypoint equal to the locations of the "express checkout" aisles when the number of items in the electronic shopping list is less than a predetermined threshold, e.g., 15 items. Otherwise, the product locator module 312 can set the checkout waypoint equal to the location of the aisles closest to the last item on the electronic shopping list. In some embodiments, the product locator module 312 can determine the entrance waypoint based on the determined checkout waypoint, e.g., the entrance nearest to the checkout waypoint. Alternatively, the entrance waypoint can be determined based on the product waypoints. For instance, if all of the products (or a majority of products) are located on the west side of the store, the entrance waypoint may be set equal to the location of the west side of the store.

At operation 418, the product locator module 312 provides the various waypoints for display at the mobile computing device 10. As discussed above, the product locator module 312 can provide the various waypoints to the mobile computing device 10. In some embodiments, the product locator module 312 can also provide a map corresponding to the store location to the mobile computing device 10, such that the mobile computing device 10 can render the map with the various waypoints displayed therein. In other embodiments, the store locator module 312 can render an image of the map with the various waypoints displayed therein, whereby the image is provided to the mobile computing device 10.

The method 400 of FIG. 8 is provided for example and not intended to be limiting. It should be appreciated that the method 400 may include additional operations and some operations may be varied without departing from the scope of the disclosure. As previously stated, the method 400 can be modified such that it may be executed by the processing device 100 of the mobile computing device 10. For example, the method 400 may be executed by the shopping assistance module 122.

Referring back to FIG. 7, the route determination module 314 determines a route to recommend to a user when shopping for the products indicated in the electronic shopping list. The route determination module 314 receives the electronic shopping list, or the items contained therein, and determines a route based on the items contained in the electronic shopping list. In some embodiments, the route determination module 314 is configured to optimize the route to minimize the amount of distance traveled and/or the amount of time spent traveling through the store.

In operation, the route determination module 314 can determine a store location of the user. Based on the store location, the route determination module 314 can obtain a map corresponding to the store location. The route determination module 314 can determine the product waypoints corresponding to the products indicated by the items in the electronic shopping list based on the items and the store location.

After the various waypoints have been determined, the route determination module 314 can determine the route based on the waypoints. Once the optimized route is determined, the route determination module 314 can provide the map, the various waypoints, and the route to the mobile computing device 10. As discussed with respect to the product locator module 312, the route determination module 314 can render and provide an image of the map with the various waypoints and the route displayed therein, or can provide the map, the product waypoints, and the route individually to the mobile computing device 10.

Figure 9:
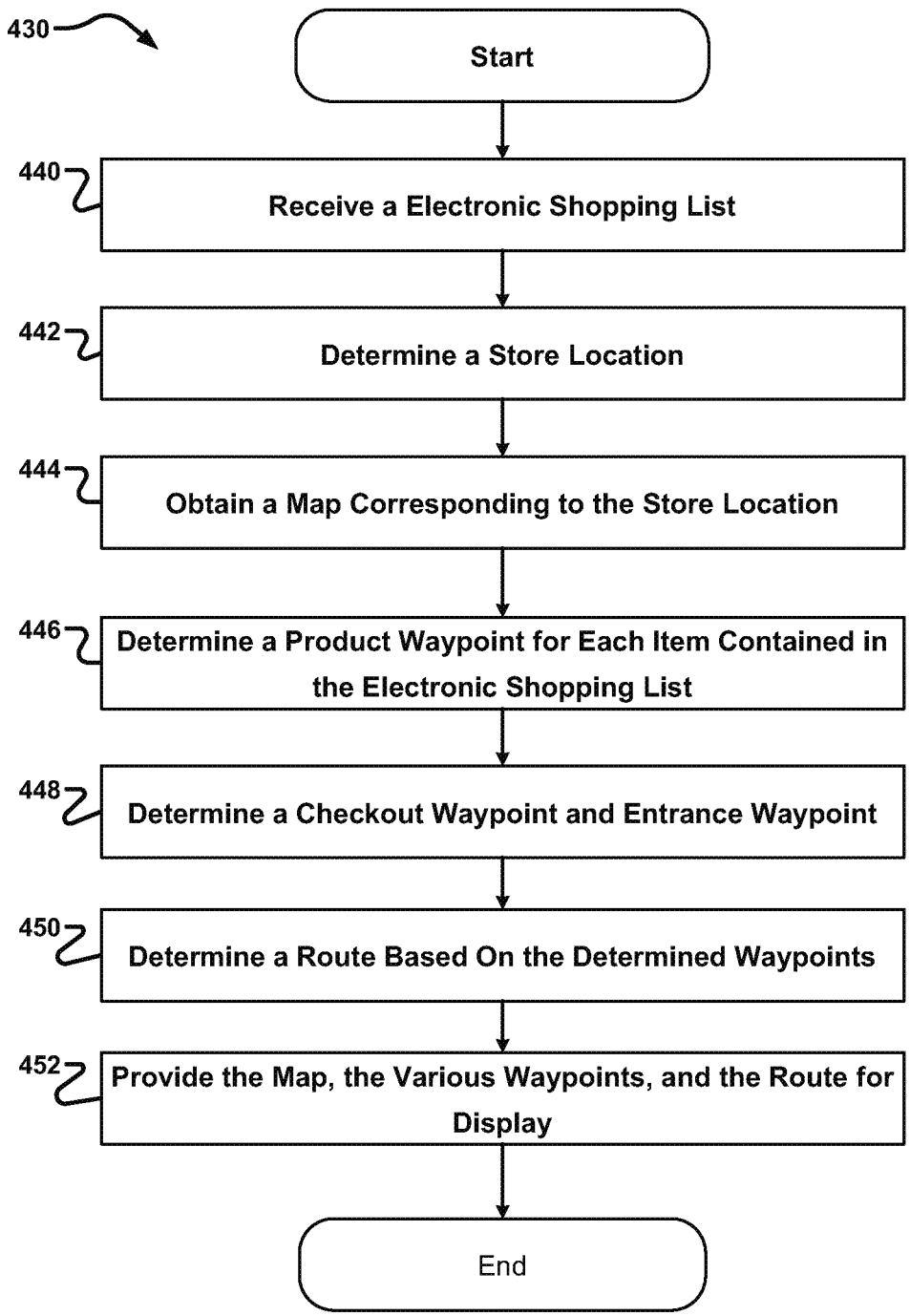
FIG. 9 is a flow chart illustrating an example method for determining a route based on items contained in an electronic shopping list according to some embodiments of the present disclosure.

Referring now to FIG. 9, an example method 430 for determining a route to recommend to a user is illustrated. In the illustrated example, the method 430 is executed by the processing device 300 of the shopping list server 30. It is noted that while the method 430 is explained with respect to the shopping list server 30, the method 430 can be modified such that the method 430 is executed wholly or in part by the processing device 100 of the mobile computing device 10.

At operation 440, the route determination module 314 receives the electronic shopping list, or the items contained therein, from the mobile computing device 10. At operation 442, the route determination module 316 determines a store location indicating a store location where the products indicated in the electronic shopping list are to be purchased. In some embodiments, the mobile computing device 10 provides the store location. In other embodiments, the mobile computing device 10 provides its current location or a city/state selection. In these embodiments, the route determination module 316 can request a store location from the store locator module 310 or can obtain the store location from the store location database 320. At operation 444, the route determination module 316 can obtain a map corresponding to the store location. The route determination module 316 can obtain the map from the store location database 320.

At operation 446, the route determination module 316 can determine a product waypoint for each item contained in the electronic shopping list. It is noted that the route determination module 314 can obtain the product waypoints from the product location database 322 or can request the product waypoints from the product locator module 312, which can determine the product waypoints in the manner discussed above.

At operation 448, the route determination module 314 can determine an entrance waypoint and a checkout waypoint based on the product waypoints. It is noted that the route determination module 314 can obtain the entrance waypoint and the checkout waypoint by requesting the entrance waypoint and checkout waypoint from the product locator module 312. Alternatively, the route determination module 314 can determine the entrance waypoint and the checkout waypoint in the manner described above.

At operation 450, the route determination module 316 can determine the route based on the determined waypoints. The route determination module 314 can determine the route in any suitable manner. For instance, the route determination module 314 can determine a route starting point, e.g., the entrance waypoint, and a route ending point, e.g., the checkout waypoint, and can then determine a route that travels through the remaining product waypoints. In some embodiments, the route determination module 314 determines one or more paths between each pair of waypoints and can assign a weight for each path. The weight of a path can indicate a distance between the two waypoints or an amount of time to travel from a first waypoint to a second waypoint. If more than one path exists between a pair of waypoints, the path having the least value is set as the path between the two waypoints. Once the paths between each pair of waypoints are determined, the route determination module 314 can determine an optimized route based on the determined paths and the weights thereof. For example, the route determination module 314 can implement Dijkstra's algorithm to determine the route that optimized with respect to the distance traveled through the store or the time spent traveling through the store.

At operation 452, the route determination module 314 can provide the map, the various waypoints, and the route to the mobile computing device 10. As discussed, the route determination module 314 can provide the map, the various waypoints, and the route individually. Alternatively, the route determination module 314 can render an image containing the map, the various waypoint, and the route and can provide the image to the mobile computing device 10.

The method 430 of FIG. 9 is provided for example and not intended to be limiting. It should be appreciated that the method 430 may include additional operations and some operations may be varied without departing from the scope of the disclosure. For example, the route determination module 314 may be configured to receive a location of the user while the user is shopping in the store, such that if the user departs from the recommended route, the route determination module 314 can update the route based on the current location of the mobile computing device 10 and the items that have yet to be checked off the electronic shopping list. Additionally or alternatively, the route determination module 314 may determine multiple routes to recommend to the user based on the items contained in the electronic shopping list. Furthermore, as previously stated, the method 430 can be modified such that it may be executed by the processing device 100 of the mobile computing device 10. For example, the method 430 may be executed by the shopping assistance module 122.

Referring back to FIG. 7, the grouping module 316 rearranges and groups the items in the electronic shopping list such that the items are grouped according to the type of the products indicated by the items. In some embodiments, the grouping module 316 receives the electronic shopping list, or the items contained therein. For each item, the grouping module 316 determines a type of the item. In some embodiments, the term "type" refers to a high-level genus of the product indicated by the item. Examples of types of items include grocery items, clothing items, accessory items, personal items, and hardware items. Each item may then be assigned to a grouping based on its type. It is noted that the groupings represent the different types, e.g., a grocery grouping, clothing grouping, and hardware grouping. Once the items have been assigned to the groupings grouped, the groupings can be provided to the mobile computing device 10. In this way, the electronic shopping list has been ordered based on groupings.

In some embodiments, the grouping module 316 can be further be configured to determine a section of each item. As discussed above, a section of the item can indicate the area of the store where the item is stocked, e.g., dairy section, frozen goods section. In these embodiments, the grouping module 316 can, for each of the groupings, assign the items in the grouping to their respective section such that items that are found in the same section are grouped in the same section. Once the items have been assigned to their respective sections, the groupings and sections can be provided to the mobile computing device 10. In this way, the electronic shopping list has been ordered based on groupings and sections.

In some embodiments, the grouping module 316 can be configured to reorder the electronic shopping list based on the locations of the products indicated in the electronic shopping list. In these embodiments, the grouping module 316 can request that an optimized route from the route determination module 314. The grouping module 314 can then reorder the items in the electronic shopping list to match the order of the waypoints in the optimized route.

Figure 10:
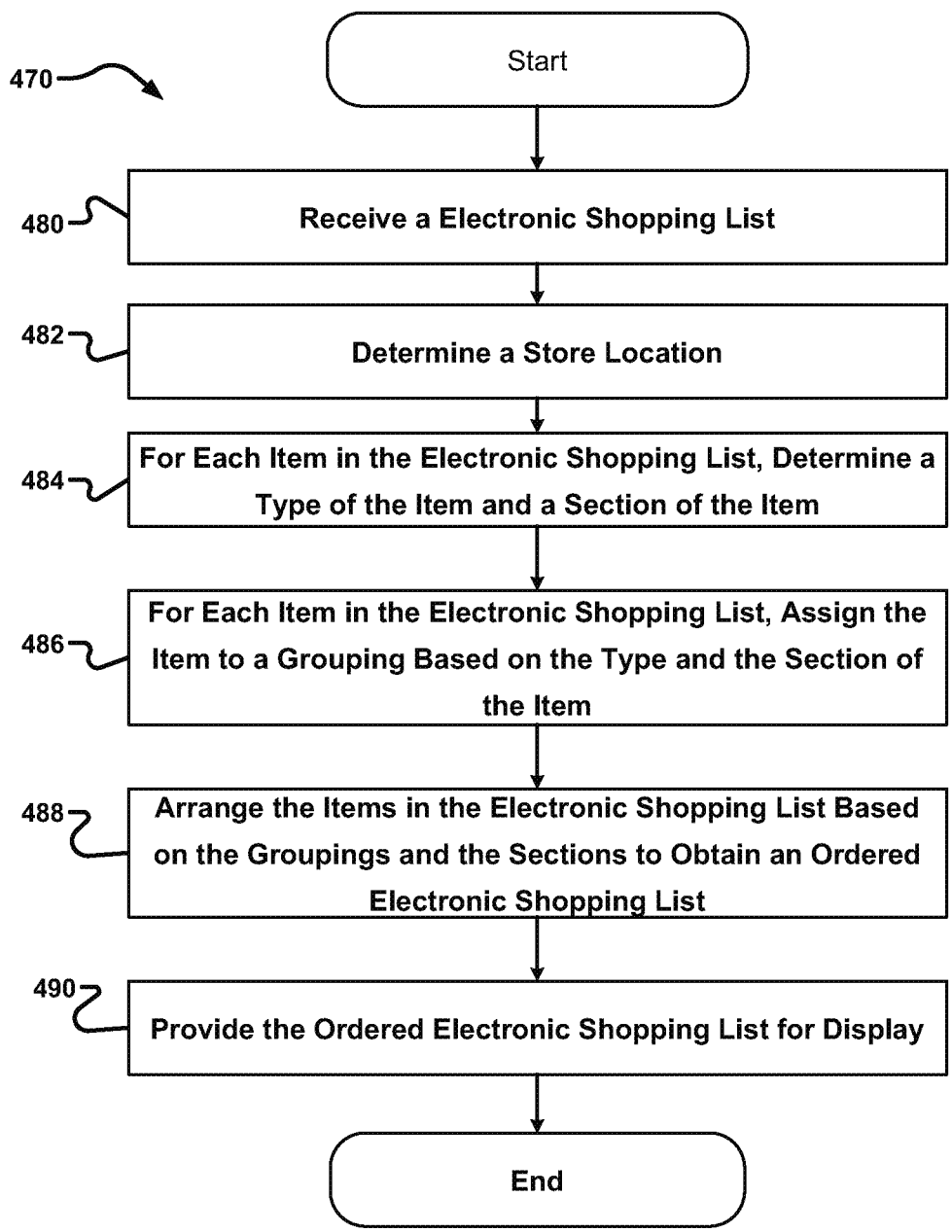
FIG. 10 is a flow chart illustrating an example method for grouping and ordering items in an electronic shopping list according to some embodiments of the present disclosure.

Referring now to FIG. 10, an example method 470 for grouping and reordering an electronic shopping list is illustrated. In the illustrated example, the method 430 is executed by the processing device 300 of the shopping list server 30. It is noted that while the method 430 is explained with respect to the shopping list server 30, the method 430 can be modified such that the method 470 is executed wholly or in part by the processing device 100 of the mobile computing device 10.

At operation 480, the grouping module 316 receives the electronic shopping list from the mobile computing device 10. At operation 482, the grouping module 316 determines a store location indicating a store where the products indicated in the electronic shopping list are to be purchased. At operation 484, the grouping module 316 determines a type and section for each item. In some embodiments, the grouping module 316 determines the type and section of an item by querying the product location database 322 with the store location and the item.

At operation 486, the grouping module 316 assigns each item to a grouping based on its type. For example, grocery items are assigned to a grocery grouping and hardware grouping are assigned to a hardware grouping. Furthermore, within each grouping, the items may be assigned to a section based on a section of the item.

At operation 488, the items in the electronic shopping list are arranged based on the groupings and the sections to obtain an ordered electronic shopping list. In some embodiments, the items are arranged such that items appearing in the same section are listed with one another, and sections belonging to the same grouping are listed with one another. In this way, the ordered electronic shopping list has been ordered according to grouping and within each grouping according to section. At operation 490, the ordered electronic shopping list is provided to the mobile computing device 10.

The method 470 of FIG. 10 is provided for example and not intended to be limiting. It should be appreciated that the method 470 may include additional operations and some operations may be varied without departing from the scope of the disclosure. As previously stated, the method 470 can be modified such that it may be executed by the processing device 100 of the mobile computing device 10. For example, the method 470 may be executed by the shopping assistance module 11.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A computer-implemented method comprising:
   receiving by a computer system comprising a communication device including one or more wireless transceivers for performing wireless communication, an electronic shopping list containing a plurality of items intended to be purchased, each item indicating a product sold by a retailer, the items being added to the electronic shopping list from the computer system or from a mobile computing device of a user, and wherein one of the items of the plurality is a last item listed on the electronic shopping list;
   acquiring, by the communication device of the computer system, GPS location data of the mobile computing device of the user;
   obtaining, by the computer system, a store map, the store map being indicative of a layout of a store associated with the retailer and wherein the store map is selected from a plurality of store maps each corresponding to one of a plurality of stores by comparing the GPS location data of the mobile computing device with GPS location data associated with each of the stores and being stored in a locations database to determine which store is most proximate to the GPS location data of the mobile computing device;
   determining, by the computer system, a plurality of product waypoints based on the plurality of items in the electronic shopping list and the store map, each product waypoint of the plurality of product waypoints corresponding to one of the plurality of items and being indicative of a location of the product indicated by the item in the store, and wherein the computer system further determines the product waypoints by querying the locations database using the items received from the electronic shopping list and the obtained store map;
   comparing, by the computer system, a number of items listed on the electronic shopping list to a predetermined threshold;
   determining, by the computer system, a first checkout lane type if the number of items is greater than the predetermined threshold, wherein a plurality of checkout lanes are of the first checkout lane type;
   determining, by the computer system, a second checkout lane type if the number of items is less than the predetermined threshold, wherein a plurality of checkout lanes are of the second checkout lane type;
   selecting, by the computer system, a checkout lane from among the checkout lanes of the first checkout lane type if the first checkout lane type is determined, wherein the checkout lane is selected for being the nearest checkout lane to the last item listed on the electronic shopping list from among the checkout lanes of the first checkout lane type;
   selecting, by the computer system, a checkout lane from among the checkout lanes of the second checkout lane type if the second checkout lane type is determined, wherein the checkout lane is selected for being the nearest checkout lane to the last item listed on the electronic shopping list from among the checkout lanes of the second checkout lane type;
   determining, by the computer system, a checkout waypoint corresponding to selected checkout lane from the locations database;
   determining, by the computer system, a route traveling through each of the plurality of product waypoints and the determined checkout waypoint, and wherein the computer system optimizes the route by determining a plurality of paths defined between product waypoints, assigning a weight to each path based on a distance or time of travel between product waypoints and by applying an algorithm to analyze the weights to optimize the route;
   rendering, by the computer system, an image of the store map having the location of the mobile computing device, the route, each of the plurality of product waypoints and the determined checkout waypoint; and providing, by the communication device of the computer system, the the rendered image of the store map for display on the mobile computing device of the user.

2. The method of claim 1, further comprising:

determining, by the computer system, an entrance waypoint indicating an entrance location of the store based on one or more of the product waypoints;

determining, by the computer system, the route traveling through the entrance waypoint; and rendering, by the computer system, the image of the store map having the entrance waypoint.

3. The method of claim 1, wherein any one or more of the items are deselectable from the electronic shopping list by the mobile computing device, wherein the computer system removes an existing product waypoint in response to deselection of the item from the electronic shopping list.

4. The method of claim 3, further comprising the step of updating, by the computer system, the route to account for removal of the existing product waypoint.

5. The method of claim 1 wherein the items are added to the electronic shopping list by converting a digital photograph of an image captured by a digital camera of the mobile device and determining one or more items to add to the electronic shopping list in response to converting the digital photograph.

6. The method of claim 1 wherein the items are added to the electronic shopping list by analyzing with the computer system at least one of a previous electronic shopping list of the user and a purchase history of the user.

7. The method of claim 1 further comprising:

acquiring, by the computer system, GPS location data of the mobile computing device of the user while the user navigates the store; and comparing, by the computer system, the GPS location data of the mobile computing device with location data associated with the determined route.

8. The method of claim 7 further comprising:

detecting, by the computer system, whether the location of the mobile computing device deviates from the determined route; and updating, by the computer system, the route in response to detecting that the mobile computing device has deviated from the determined route.

9. The method of claim 1 wherein determining, by the computer system, the route further comprises determining a plurality of routes traveling through each of the plurality of product waypoints and the determined checkout waypoint and presenting the plurality of routes to the mobile computing device for selection by the user.

10. The method of claim 1 wherein applying the algorithm is further defined as applying Dijkstra's algorithm.

11. A server comprising:

at least one processor;

a communication device including one or more wireless transceivers for performing wireless communication;

memory operably connected to the at least one processor; and the memory storing:

a store locator module configured to obtain a store map, the store map being indicative of a layout of a store associated with a retailer and wherein the store locator module is configured to acquire GPS location data of a mobile computing device of the user using the communication device and select the store map from a plurality of store maps each corresponding to one of a plurality of stores by comparing the GPS location data of the mobile computing device with GPS location data associated with each of the stores and being stored in a locations database to determine which store is most proximate to the GPS location data of the mobile computing device;

a route determination module configured to receive an electronic shopping list containing a plurality of items intended to be purchased, from a mobile computing device, each item indicating a product sold by a retailer, the items being added to the electronic shopping list from the server or from a mobile computing device of a user, and wherein one of the items of the plurality is a last item listed on the electronic shopping list;

a locator module configured to:

determine a plurality of product waypoints based on the plurality of items in the electronic shopping list and the store map, each product waypoint of the plurality of product waypoints corresponding to one of the plurality of items and being indicative of a location of the product indicated by the item in the store and wherein the locator module is further configured to determine the product waypoints by querying the locations database using the items received from the electronic shopping list and the obtained store map;

compare a number of items listed on the electronic shopping list to a predetermined threshold;

determine a first checkout lane type if the number of items is greater than the predetermined threshold, wherein a plurality of checkout lanes are of the first checkout lane type;

determine a second checkout lane type if the number of items is less than the predetermined threshold, wherein a plurality of checkout lanes are of the second checkout lane type;

select a checkout lane from among the checkout lanes of the first checkout lane type if the first checkout lane type is determined, wherein the checkout lane is selected for being the nearest checkout lane to the last item listed on the electronic shopping list from among the checkout lanes of the first checkout lane type;

select a checkout lane from among the checkout lanes of the second checkout lane type if the second checkout lane type is determined, wherein the checkout lane is selected for being the nearest checkout lane to the last item listed on the electronic shopping list from among the checkout lanes of the second checkout lane type; and determine a checkout waypoint corresponding to the selected checkout lane from the locations database;

and wherein the route determination module is further configured to:

determine a route traveling through each of the plurality of product waypoints and the determined checkout waypoint and to optimize the route by determining a plurality of paths defined between product waypoints, assigning a weight to each path based on a distance or time of travel between product waypoints, and by applying an algorithm to analyze the weights to optimize the route;

render an image of the store map having the location of the mobile computing device, the route, each of the plurality of product waypoints and the determined checkout waypoint; and provide, using the communication device, the rendered image of the store map for display on the mobile computing device of the user.

12. The server of claim 11, wherein:
the locator module is further configured to determine an entrance waypoint indicating an entrance location of the store based on one or more of the product waypoints, and the route determination module is further configured to determine the route based on the entrance waypoint and to render the image of the store map having the entrance waypoint.

13. The server of claim 11 wherein the route determine module is further configured to receive a deselection of any one or more of the items from the electronic shopping list by the mobile computing device, wherein the route determine module removes an existing product waypoint in response to deselection of the item from the electronic shopping list.

14. The server of claim 13 wherein the route determine module is further configured to update the route to account for removal of the existing product waypoint.

15. The server of claim 11 wherein the route determine module is further configured to convert a digital photograph of an image captured by a digital camera of the mobile device and to determine one or more items to add to the electronic shopping list in response to converting the digital photograph.

16. The server of claim 11 wherein the route determine module is further configured to add one or more items to the electronic shopping list by analyzing at least one of a previous electronic shopping list of the user and a purchase history of the user.

17. The server of claim 11 wherein the store locator module is further configured to:
acquire GPS location data of the mobile computing device of the user while the user navigates the store; and
compare the GPS location data of the mobile computing device with location data associated with the determined route.

18. The server of claim 17 wherein the store locator module is further configured to:
detect whether the location of the mobile computing device deviates from the determined route; and
update the route in response to detecting that the mobile computing device has deviated from the determined route.

19. The server of claim 11 wherein the locator module is further configured to:
determine a plurality of routes traveling through each of the plurality of product waypoints and the determined checkout waypoint; and
present the plurality of routes to the mobile computing device for selection by the user.

20. The server of claim 11 wherein the algorithm is further defined as Dijkstra's algorithm.

* * * * *